United States Patent [19]

Duckworth, Jr.

[11] 4,098,427
[45] Jul. 4, 1978

[54] SEALING CAP ASSEMBLY FOR AIRCRAFT LAVATORY DRAIN PORT

[76] Inventor: Milton Donald Duckworth, Jr., 1316 Orchard Lakes, St. Louis, Mo. 63141

[21] Appl. No.: 778,614

[22] Filed: Mar. 17, 1977

[51] Int. Cl.² .................. B65D 43/16; B65D 43/18
[52] U.S. Cl. ........................... 220/259; 138/89; 137/800
[58] Field of Search ............ 137/613, 800; 251/66, 251/74; 220/256, 259, 235, 238; 138/89

[56] References Cited

U.S. PATENT DOCUMENTS

| 1,978,314 | 10/1934 | Lancaster | 220/259 |
| 3,302,816 | 2/1967 | Shoper et al. | 220/259 |

*Primary Examiner*—George T. Hall
*Attorney, Agent, or Firm*—James R. Bell

[57] ABSTRACT

A sealing cap assembly for aircraft lavatory drain ports includes first and second pivotal doors secured to the port in spaced sealing relationship.

17 Claims, 4 Drawing Figures

SEALING CAP ASSEMBLY FOR AIRCRAFT LAVATORY DRAIN PORT

BACKGROUND OF THE INVENTION

1. Field of the Invention

This invention relates generally to fluid handling and more particularly to hinged type liquid valve seals.

2. Description of the Prior Art

Generally, waste accumulated during aircraft passenger flights is held in a collecting tank until, after landing, airport facilities are used to drain the waste from the tanks. To drain the waste, a port is provided in a convenient location in the aircraft fuselage. A removable plug is inserted into the drain port for maintaining the waste in the tank. Prior to draining the tank, the plug is removed.

In order to achieve plug removal, a bi-conduit valve and plug assembly was devised. In this prior art arrangement the valve was fitted to the port and a key was used to remove and retract the plug into one of the conduits while the waste was drained through the other conduit of the valve. While this arrangement is generally satisfactory, the plug has presented some problems.

The plug of the prior art is generally annular including a radially expandable resilient sealing member. With little tolerance between the annular inner periphery of the port prior to expansion, only slight radial expansion of the resilient member is required to urge the outer annular periphery of the resilient member into sealing engagement within the port.

One problem associated with such plugs has involved certain difficulty experienced by ground crew personnel in reinserting the plug into the port after the tank is drained. The plug will sometimes "hang-up" on the port sidewall so as to make plug reentry into the port difficult. Also, should the plug be misaligned in the port, it is still possible to actuate the plug locking mechanism so that in effect the ground crewman thinks the plug is properly seated and locked in the port when, in fact, the plug is misaligned in the port and the locking mechanism may become jammed.

As a result, a leak may occur during high altitude flight due to the pressure differential across the misalinegd plug. Leaking fluid can freeze at high altitude resulting in a hazardous ice formation on the aircraft in the vicinity of the port.

It would be advantageous to have a novel seal for the port which avoids the common problems associated with the prior art plugs.

SUMMARY OF THE INVENTION

The present invention is directed to overcoming one or more of the problems as set forth above.

According to the present invention, this is accomplished by providing a sealing cap assembly for aircraft lavatory drain ports including first and second pivotal doors secured to the port in spaced sealing relationship. The doors can be secured to seal closed and can be pivoted open.

The above and further novel features of the invention will appear more fully from the following detailed description when the same is read in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
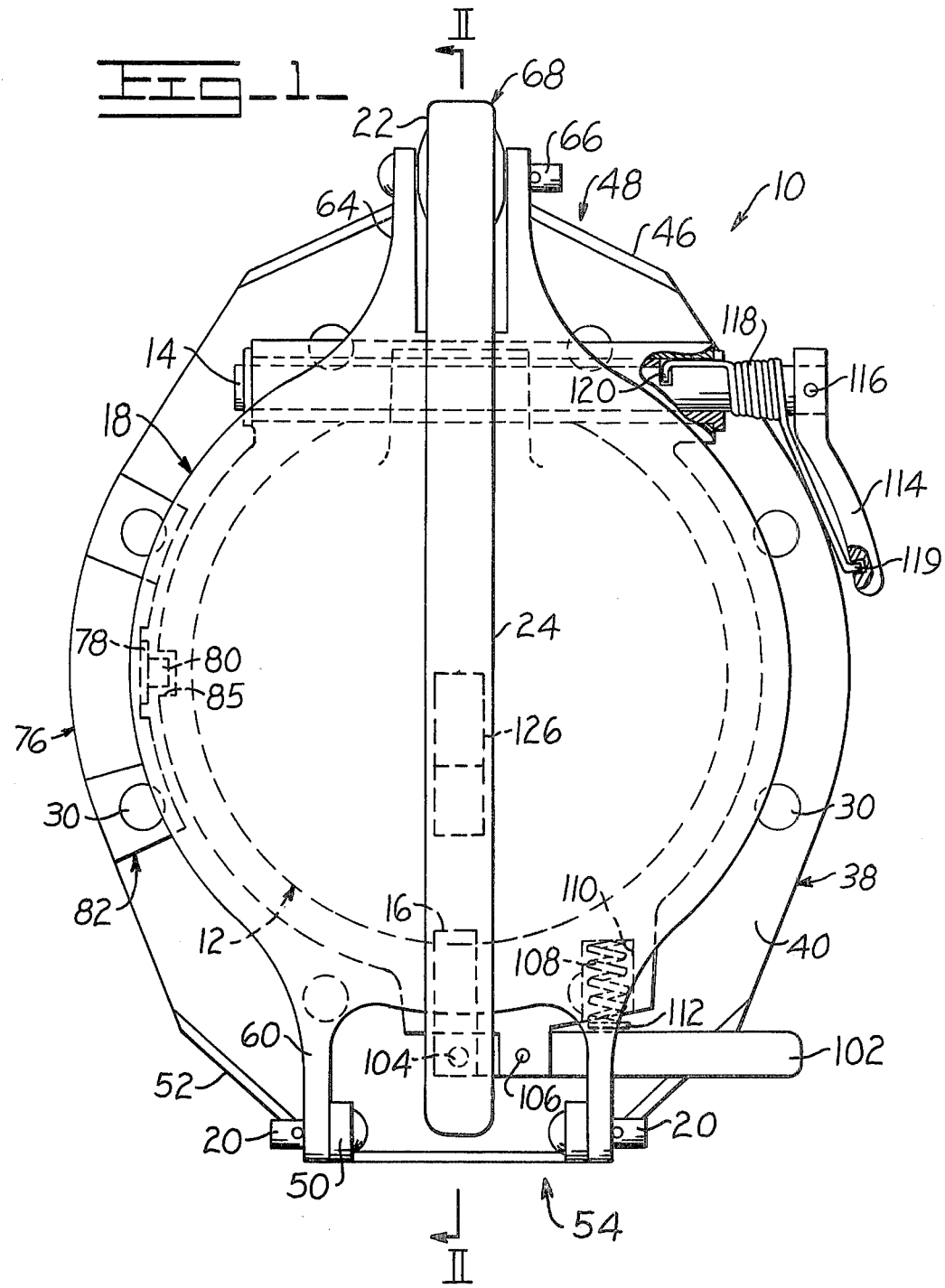
FIG. 1 is a plan view illustrating the novel sealing cap assembly of this invention with the first and second doors secured closed.

Referring now to the drawings, FIG. 1 illustrates a cap assembly generally designated 10 for sealing aircraft lavatory drain ports. The assembly generally includes a first door 12, preferably stainless steel, mounted at shaft 14 to pivot between open and closed positions and a first door securing tab 16 for securing door 12 in the closed position. Second door 18, preferably stainless steel, is mounted at pin 20 to pivot between open and closed positions and a second door securing means 22 is attached to a handle 24 for securing door 18 in the closed position.

Figure 2:
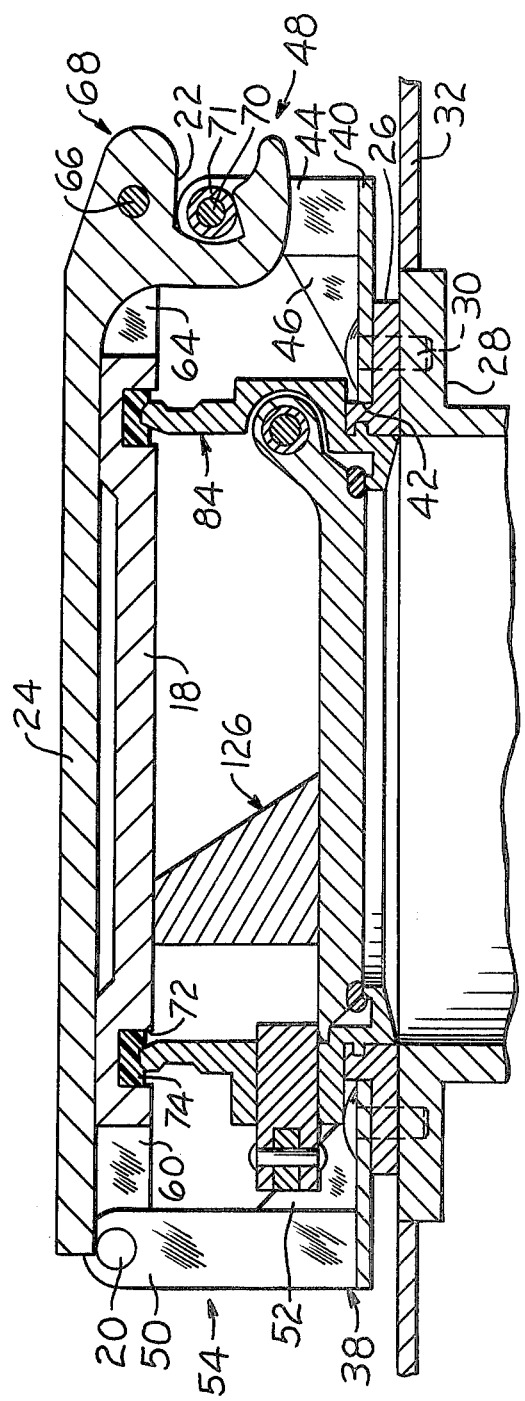
FIG. 2 is a cross-sectional side elevation illustrating the assembly of FIG. 1.
Figure 4:
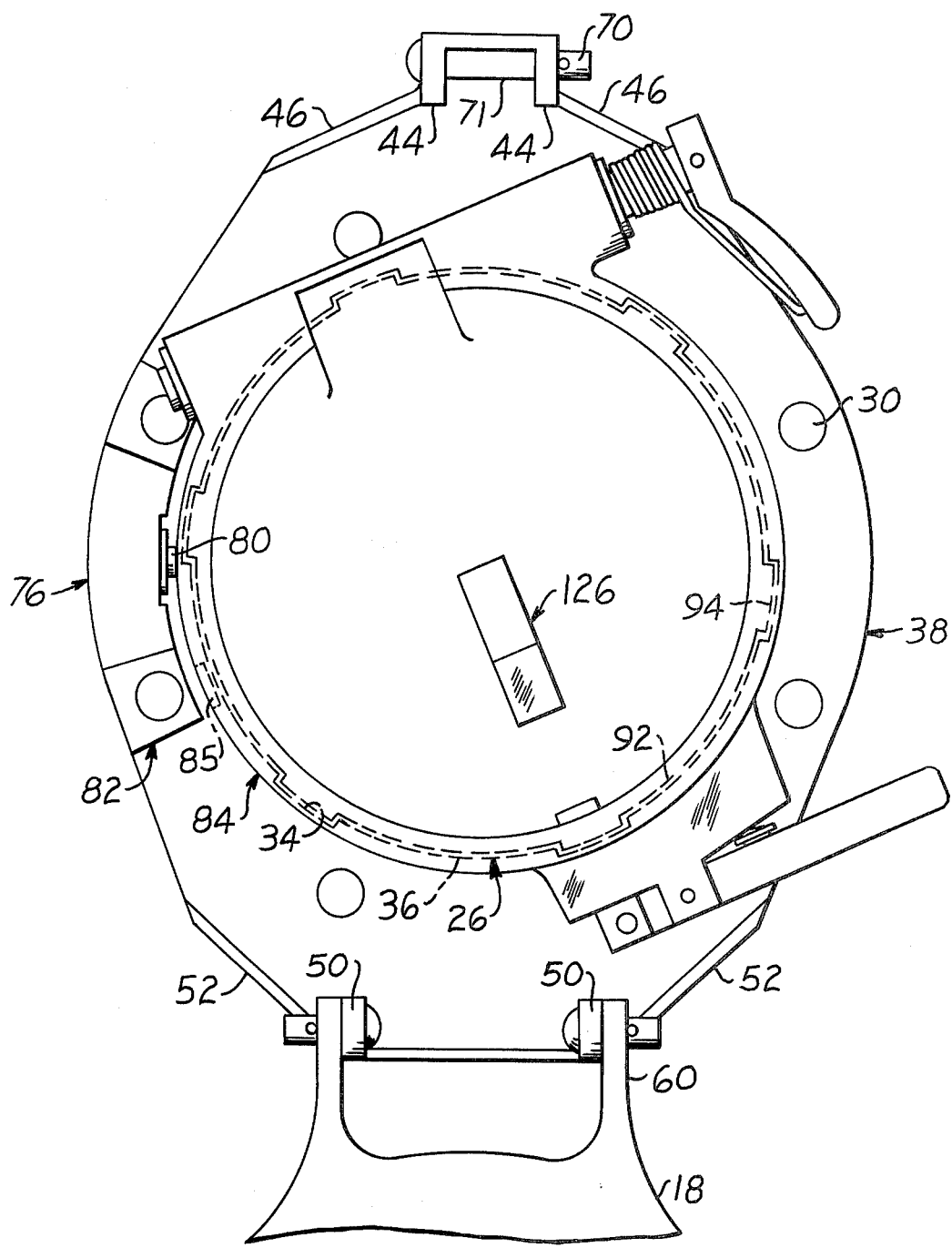
FIG. 4 is another plan view illustrating the sealing cap assembly of this invention.

FIGS. 2 and 4 illustrate a flanged nipple 26, preferably stainless steel, secured to port 28 such as by bolts 30. Port 28 is mounted in aircraft fuselage 32. Notches 34 and flanges 36 comprise flanged nipple 26.

Cradle portion 38, preferably stainless steel, is also mounted on port 28 and fuselage 32 by the bolts 30, see FIGS. 1 and 2. The cradle portion includes a disc-like base portion 40 having an aperture 42 therein for engaging nipple 26. Brackets 44 extend upwardly from base 40 and are reinforced by flanges 46 at a cradle portion first end 48. Other similar brackets 50 extend upwardly from base 40 and are similarly reinforced by flanges 52 at cradle portion second end 54.

Door 18, FIG. 2, is pivotally connected to cradle portion 38 and is generally disc-like and includes arms 60 pivotally connected to brackets 50 by pins 20 at end 54. Door 18 also includes arms 64 pivotally connected by pin 66 to elongated handle 24 which includes a claw-like securing portion 22 at end 68 thereof for engaging shaft 70 and bushing 71 between brackets 44 for securing door 18 in the closed position. Annular groove 72 is formed in door 18 and resilient sealing "O" ring 74, preferably of a well-known suitable sealing material such as neoprene rubber or the like, is mounted in groove 72.

A locking tab portion 76, FIG. 1, includes resilient tab 78 preferably of spring steel nub 80 mounted thereon. Locking tab 76 is connected to locking tab base 82 mounted on cradle portion 38 by bolts 30.

Figure 3:
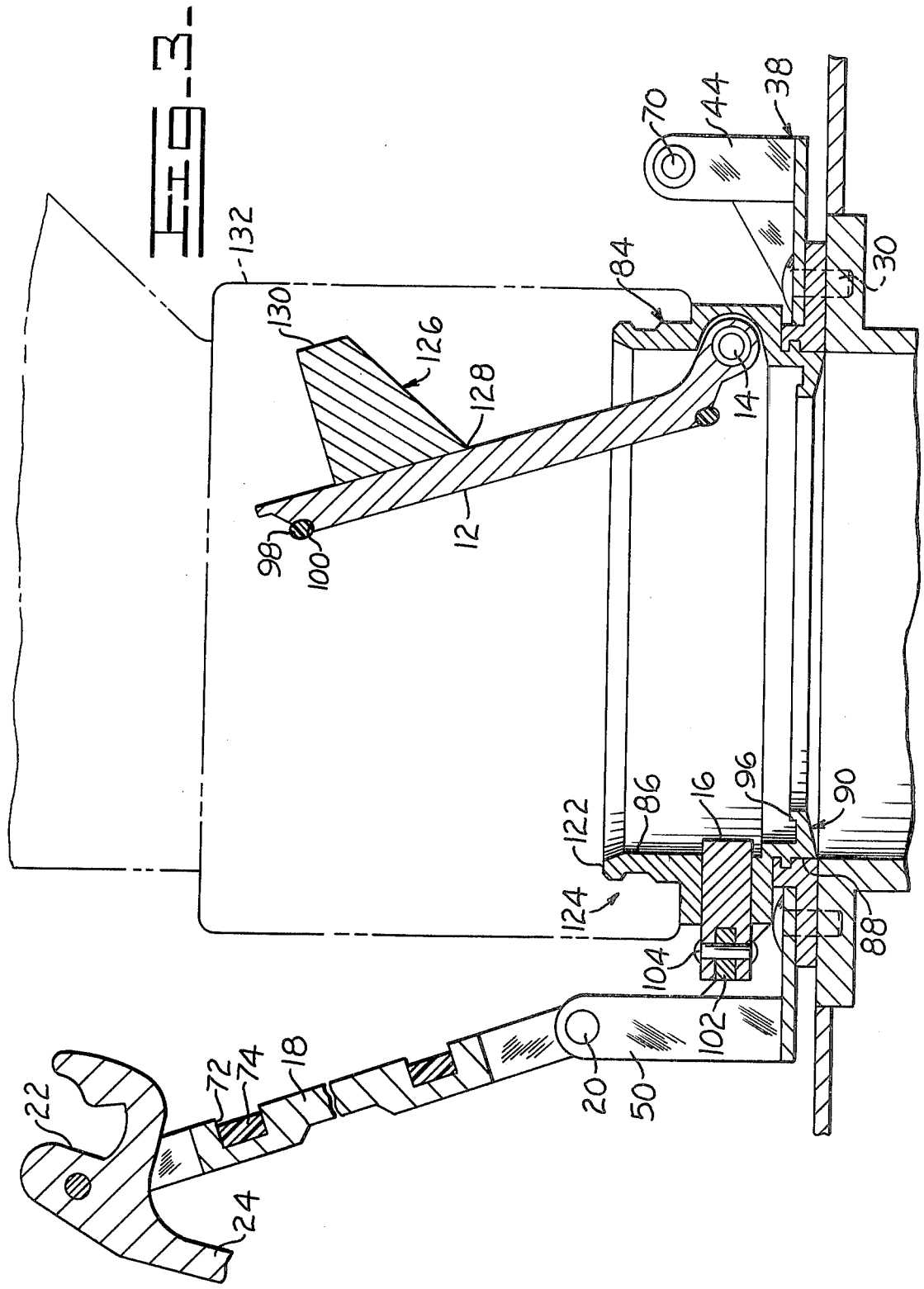
FIG 3 is a cross-sectional side elevation illustrating the assembly with the first and second pivoted open.

A first door assembly 84, FIGS. 3 and 4, is preferably formed of stainless steel and releasably mounted on cradle portion 38. This is accomplished by provding the generally cylindrical portion 86 of door assembly 84 with a flanged outer periphery 88 at first end 90 thereof including notches 92 and flanges 94 correspondingly formed for rotating engagement with notches 34 and flanges 36 of flanged nipple 26. Detent 85 is formed in the outer periphery of cylindrical portion 86, see FIG. 4.

Annular seat 96 is formed adjacent first end 90 for sealing engagement with resilient sealing "O" ring 98, preferably formed of neoprene rubber, mounted in groove 100 of first sealing door 12. Door 12 is pivotally mounted in first door assembly 84 at shaft 14.

Tab 16 is pivotally connected to lever 102 at pin 104, see also FIG. 1. Lever 102 is pivotally connected to door assembly 84 at pin 106. Resilient steel spring 108 is compressed in bore 100 to urge outwardly against lever 102 at nub 112 thus resiliently urging tab 16 into locking engagement with door 12.

Handle 114 is pinned at 116 to shaft 14, see FIG. 1. Spring 118, preferably steel, is secured to handle 114 at first end 119 and is secured to shaft 14 at second end 120 for spring loading shaft 14 to rotate thus automatically pivoting fixedly attached door 12 to the open position.

Annular rim 122, FIG. 3, of door assembly 84 is formed at second end 124 to sealingly seat with sealing ring 72 on second door 18. Nub 126 is mounted on door 12 at first end 128 and terminates at second end 130 for engagement with second door 18. Thus second door 18 sealingly seats on rim 122 and engages nub second end 130 for urging first door 12 into sealing engagement with seat 96. In this manner, first and second sealing doors 12, 18, respectively, are maintained in spaced sealing relationship.

When second door 18 is rotated to the open position, FIG. 3, a well-known coupling 132, shown in phantom outline, can be secured to annular rim 122 at second end 124 of door assembly 84. Tab 16 can then be actuated to release door 12 to spring open thus permitting waste to be withdrawn from the associated aircraft lavatory drain port 28.

OPERATION

Flanged nipple 26 and cradle assembly 38 are secured to port 28 by bolts 30. Door 18 is opened and door assembly notches and flanges 92,94 are aligned with nipple 26 notches and flanges 34,36 as shown in FIG. 4. Lock tab nub 80 rests against door assembly 84 and the door assembly is rotated until nub 80 snaps into anti-rotating locking engagement with detent or recess 85 in door assembly 84, FIG. 1, to limit relative radial movement of the door assembly. In this position, the flanges 36 are engaged with the flanges 94 to limit relative axial movement between door assembly 84 and cradle assembly 38. With door 12 seated at "O" ring 98 engaging seat 96, and tab 16 securing door 12 closed, door 18 is pivoted closed with "O" ring 74 sealingly engaging rim seal 122. Handle 24 is pivoted to engage claw 22 with shaft 70. Thus, door 18 engages second end 130 of nub 126 to further urge door 12 into sealing engagement with seat 96. Thus, a double sealing door seal is formed to seal port 28, FIG. 2.

When waste is to be removed from the associated aircraft via port 28, handle 24 is pivoted to release claw 22 from shaft 70 and door 18 can be pivoted open, FIG. 3. Coupling 132 is secured to door assembly 84 at rim 122 in the well-known manner. Lever 102 is urged against spring 108 to pivot so that tab 16 moves to release spring-loaded door 12 to automatically spring open. If for some reason door 12 fails to automatically spring open, handle 114 can be used to manually pivot door 12 open thus permitting waste to flow from the aircraft via port 28 and coupling 132. Once the waste is removed, doors 12 and 18 can be pivoted to their sealingly closed positions as described above until it becomes necessary to again remove waste from the associated aircraft.

The foregoing has described a two-door seal for an aircraft lavatory drain port which doors can pivot between open and closed positions with respect to the port thus providing a double door seal for the port.

The embodiments of the invention in which an exlusive property of privilege is claimed are defined as follows:

1. A cap assembly for sealing aircraft lavatory drain ports, comprising:
    a first sealing door being of a construction sufficient for pivoting between an open position and a closed sealing position;
    a second sealing door being of a construction sufficient for pivoting between an open position and a closed sealing position in spaced sealing relationship with the first door in the closed sealing position;
    first door securing means connected for securing the first door in the closed position; and
    second door securing means connected for securing the second door in the closed position.

2. The assembly of claim 1, further comprising:
    seating nub means connected to the first door for engagement with the second door when the first and second doors are in their closed positions, respectively.

3. The assembly of claim 1, wherein the first door securing means comprises:
    resiliently urged locking tab means connected for locking the first sealing door in the closed position.

4. The assembly of claim 3, further comprising:
    resilient means connected for automatically pivoting the first door from the closed to the open position.

5. The assembly of claim 4, further comprising:
    an elongated handle pivotally connected to the second door.

6. The assembly of claim 5 wherein the second door securing means includes claw-like means at one end of the handle for securing the second door in the closed position.

7. A cap assembly for sealing aircraft lavatory drain ports; comprising:
    a nipple portion;
    first door means connected to the nipple for moving from an open to a closed sealing position;
    means connected for securing the first door in the closed sealing position;
    second door means connected to the nipple for moving from an open to a closed sealing position in spaced sealing relationship with the first door in the closed sealing position; and
    means connected for securing the second door in the closed sealing position.

8. The assembly of claim 7 comprising a first door assembly releasably mounted on the nipple.

9. The assembly of claim 8 comprising a cradle portion connected to the nipple.

10. The assembly of claim 9 comprising means on the cradle portion for securing the first door assembly in anti-releasing engagement with the nipple.

11. The assembly of claim 8 wherein the first door assembly includes resilient means connected for automatically pivoting the first door from the closed to the open position.

12. The assembly of claim 7 wherein the second door includes an elongated handle pivotally connected thereto.

13. The assembly of claim 12 wherein the means for securing the second door includes claw-like means at one end of the handle for securing the second door in the closed position.

14. The assembly of claim 7, further comprising:
seating nub means connected to the first door for engagement with the second door when the first and second doors are in their closed positions, respectively.

15. The assembly of claim 8 wherein the first door assembly includes means for rotating engagement with the nipple.

16. In combination with a lavatory drain port of the type mounted on an aircraft fuselage, the improvement comprising:
first door means connected to the port for moving from an open to a closed sealing position;
means connected for securing the first door in the closed sealing position;
second door means connected to the port for moving from an open to a closed sealing position in spaced sealing relationship with the first door in the closed sealing position; and
means connected for securing the second door in the closed sealing position.

17. A cap assembly for sealing aircraft lavatory drain ports, comprising:
first door means connected in the assembly for moving from an open to a closed sealing position;
means connected in the assembly for securing the first door in the closed sealing position;
second door means connected in the assembly for moving from an open to a closed sealing position in spaced sealing relationship with the first door means in the closed sealing position; and
means connected in the assembly for securing the second door in the closed sealing position.

* * * * *

UNITED STATES PATENT AND TRADEMARK OFFICE
CERTIFICATE OF CORRECTION

PATENT NO. : 4,098,427
DATED : July 4, 1978
INVENTOR(S) : Milton Donald Duckworth, Jr.

It is certified that error appears in the above—identified patent and that said Letters Patent are hereby corrected as shown below:

Col. 2, line 9, after "second" insert --- doors ---

Col. 2, line 53, after "steel" insert --- and ---

Signed and Sealed this

Fifth Day of December 1978

[SEAL]

Attest:

RUTH C. MASON
Attesting Officer

DONALD W. BANNER
Commissioner of Patents and Trademarks